(12) United States Patent
Kashiwagi et al.

(10) Patent No.: US 7,462,106 B2
(45) Date of Patent: Dec. 9, 2008

(54) CONSTANT VELOCITY UNIVERSAL JOINT

(75) Inventors: Isashi Kashiwagi, Kariya (JP); Minoru Wakamatsu, Kariya (JP); Atsushi Ando, Kariya (JP); Kazuyuki Ichikawa, Okazaki (JP)

(73) Assignee: Toyoda Koki Kabushiki Kaisha, Kariya-shi (JP)

( * ) Notice: Subject to any disclaimer, the term of this patent is extended or adjusted under 35 U.S.C. 154(b) by 350 days.

(21) Appl. No.: 11/270,628

(22) Filed: Nov. 10, 2005

(65) Prior Publication Data

US 2006/0116210 A1 Jun. 1, 2006

(30) Foreign Application Priority Data

Nov. 11, 2004 (JP) .............................. 2004-327361
Apr. 11, 2005 (JP) .............................. 2005-113385

(51) Int. Cl.
*F16D 3/26* (2006.01)
(52) U.S. Cl. ....................... 464/111; 464/905
(58) Field of Classification Search ................ 464/111, 464/905, 123, 124, 120
See application file for complete search history.

(56) References Cited

U.S. PATENT DOCUMENTS 5,362,275 A * 11/1994 Girguis .................. 464/111
5,474,500 A * 12/1995 Girguis .................. 464/111
6,749,516 B2 * 6/2004 Margerie ................ 464/111

* cited by examiner

*Primary Examiner*—Aaron M Dunwoody
(74) *Attorney, Agent, or Firm*—Oblon, Spivak, McClelland, Maier & Neustadt, P.C.

(57) ABSTRACT

A constant velocity universal unit includes an outer joint member whose inner peripheral face is formed with three guide grooves, an inner joint member including three tripod shafts each formed with a tripod spherical face, three roller units each including an outer peripheral face and an inner peripheral face coaxially formed with each other. The guide groove includes a pair of strip-shaped inner side faces formed with a pair of guide projections having a substantially half arc shape in cross section whose diameter is smaller than a height of the inner side face of the guide groove. The constant velocity universal joint further includes an annular recess formed on a substantially center portion in a height direction of the outer peripheral face of the roller unit and engaging with the pair of guide projections in a rolling manner and rotatable relative to a central axis of the guide projection.

14 Claims, 6 Drawing Sheets

US 7,462,106 B2

CONSTANT VELOCITY UNIVERSAL JOINT

CROSS REFERENCE TO RELATED APPLICATIONS

This application is based on and claims priority under 35 U.S.C. § 119 to Japanese Patent Application No. 2005-113385, filed on Apr. 11, 2005 and Japanese Patent Application No. 2004-327361, filed on Nov. 11, 2004, the entire content of which is incorporated herein by reference.

FIELD OF THE INVENTION

This invention generally relates to a constant velocity universal joint. More particularly, this invention pertains to a constant velocity universal joint used in a power transmission system of, for example, an automobile.

BACKGROUND

A known constant velocity universal joint is disclosed in Japanese Patent Laid-Open Publication No. 2004-125175. A substantially equal constant velocity universal joint to that disclosed in Japanese Patent Laid-Open Publication No. 2004-125175 is shown in the attached drawings, i.e. FIGS. 9 to 11. The constant velocity universal joint includes an outer joint member 1 having a cylindrical body 1a whose inner periphery is formed with three guide grooves 2 at even intervals which extend in parallel with a central axis of the outer joint member 1, an inner joint member 3 having three tripod shafts 3b extending radially outwardly at even intervals from a boss portion 3a, a tip end portion of each tripod shaft 3b being formed with a tripod spherical face 3c, and three roller units 6 for each connecting the outer joint member 1 and the inner joint member 3 to each other. The roller unit 6 includes an annular outer roller 7 having an outer peripheral face 7a of a protruding arc shape that is made contact with a guide face 2a of a large recess arc shape of the guide grove 2 in a rolling manner, and an inner ring 8 engaging with an inner periphery of the outer roller 7 so as to be relatively rotatable thereto by means of a needle roller 9 and having an inner peripheral face 8a into which the tripod spherical face 3c of the inner joint member 3 is rotatably inserted.

According to the constant velocity universal joint disclosed, as shown in FIG. 10 illustrating a main portion of a cross section perpendicular to a central axis of the inner joint member 3, under a torque transmitted state, the outer peripheral face 7a of the outer roller 7 is made contact with and pressed against the guide face 2a of the guide groove 2 by means of force Fe from the tripod shaft 3b on a loaded side S1 on which a driving force is transmitted. On the other hand, on a non-loaded side S2, the outer peripheral face 7a of the outer roller 7 is separated from the guide face 2a of the guide groove 2 so as to form some gap therebetween. In such circumstances, the roller unit 6 is rotatable relative to an axis (which is normally positioned on a center plane Pa formed by connecting respective centerlines of the guide faces 2a on both sides of the guide groove 2) that passes through a center Oa of an arc-shaped cross section of the outer peripheral face 7a of the outer roller 7 on the loaded side S1 and is in parallel with a central axis of the inner joint member 3 (hereinafter simply called "relative to the center Oa"). According to such the constant velocity universal joint of a tripod type, when the joint members 1 and 3 are rotated with a joint angle formed therebetween, the tripod shaft 3b on which the tripod spherical face 3c is formed reciprocates, in response to a rotation of the constant velocity universal joint, in a radial direction relative to the roller unit 6, whose radial position is specified by means of the guide face 2a of the outer joint member 1. Then, a variable offset Lt is generated between a line of action of the force Fe passing through a contact point Q between the tripod spherical face 3c and the inner peripheral face 8a, and the center Oa. In a state shown in FIG. 10, moment for rotating the roller unit 6 relative to the center Oa is generated by means of the force Fe and the offset Lt. Further, friction force μFe (μ is a coefficient of friction between the inner peripheral face 8a and the tripod spherical face 3c) is generated at the contact point Q between the inner peripheral face 8a of the inner ring 8 and the tripod spherical face 3c shifted in a radial direction in the aforementioned manner. A distance between a line of action of the friction force μFe and the center Oa is Lk1. The friction force μFe and the distance Lk1 also generate the moment for rotating the roller unit 6 relative to the center Oa.

The roller unit 6 is rotated relative to the center Oa by means of moment Mz obtained by the force Fe and the offset Lt, and by the friction force μFe and the distance Lk1. In cases where a gap between the outer peripheral face 7a of the outer roller 7 and the guide face 2a of the guide groove 2 on the non-loaded side S2 is small, the outer peripheral face 7a and the guide face 2a are made contact with each other, thereby generating reaction force Fc1 as shown in FIG. 11. Then, thrust force for pushing the outer joint member 1 and the inner joint member 3 in axially opposite directions to each other is induced by means of friction resistance caused by the reaction force Fc1 on the contact portion. According to the moment Mz by the friction force μFe and the distance Lk1, the sign of value is changed depending on a direction of reciprocation of the tripod shaft 3b. However, the absolute value is not changed, which results in a constant absolute value of the induced thrust force. On the other hand, the moment Mz obtained by the force μFe and the offset Lt increases in the quadratic function since the offset Lt increases in the quadratic function in response to a joint angle between the joint members 1 and 3. According to the constant velocity universal joint shown in FIGS. 9 to 11, a diameter of the protruding arc forming the guide face 2a of the guide groove 2 is larger than a height (i.e. a length in a vertical direction in FIGS. 10 and 11) of the guide face 2a. Thus, as shown in FIG. 11, an inclination angle θa of a line of action of the reaction force Fc1 relative to the center plane Pa is small, which leads to a small distance Lc1 between the line of action of the reaction force Fc1 and the center Oa. As a result, the value of the reaction force Fc1 becomes large. In such circumstances, the friction resistance in association with the contact between the outer peripheral face 7a and the guide face 2a is large, which may cause a large induced thrust force. The possibility of vibration and noise may be increased depending on a use condition of the constant velocity universal joint.

Thus, a need exists for a constant velocity universal joint in which an engaging portion between a guide groove and a roller unit is improved so as not to cause vibration or noise.

SUMMARY OF THE INVENTION

According to an aspect of the present invention, a constant velocity universal joint includes an outer joint member including a cylindrical body whose inner peripheral face is formed with three guide grooves at even intervals, each guide groove extending in parallel with a central axis of the cylindrical body, an inner joint member including three tripod shafts extending radially outwardly at even intervals from a boss portion, each tripod shaft being formed with a tripod spherical face at a tip end portion, three roller units each including an outer peripheral face and a cylindrical inner peripheral face coaxially formed with each other, the inner peripheral face slidably engaging with the tripod spherical face, and the outer peripheral face engaging with the guide groove in a rolling manner along with a longitudinal direction of the guide groove. The guide groove includes a pair of strip-shaped inner side faces facing in parallel with each other relative to a plane radially extending from the central axis, the pair of inner side faces being formed with a pair of guide projections formed on a substantially center portion in a height direction of the inner side face so as to extend in parallel with the central axis of the cylindrical body and having a substantially half arc shape in cross section whose diameter is smaller than a height of the inner side face of the guide groove. The constant velocity universal joint further includes an annular recess formed on a substantially center portion in a height direction of the outer peripheral face of the roller unit so as to extend in a circumferential direction and engaging with the pair of guide projections in a rolling manner and rotatable relative to a central axis of the guide projection. The roller unit is assembled on the guide groove in such a manner that the pair of guide projections engage with the guide groove.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

A first embodiment of the present invention is explained with reference to FIGS. 1 to 4. First, a structure of a constant velocity universal joint according to the first embodiment is explained with reference to FIGS. 1 to 3. The constant velocity universal joint includes an outer joint member 10, an inner joint member 20, and a roller unit 25.

Figure 1:
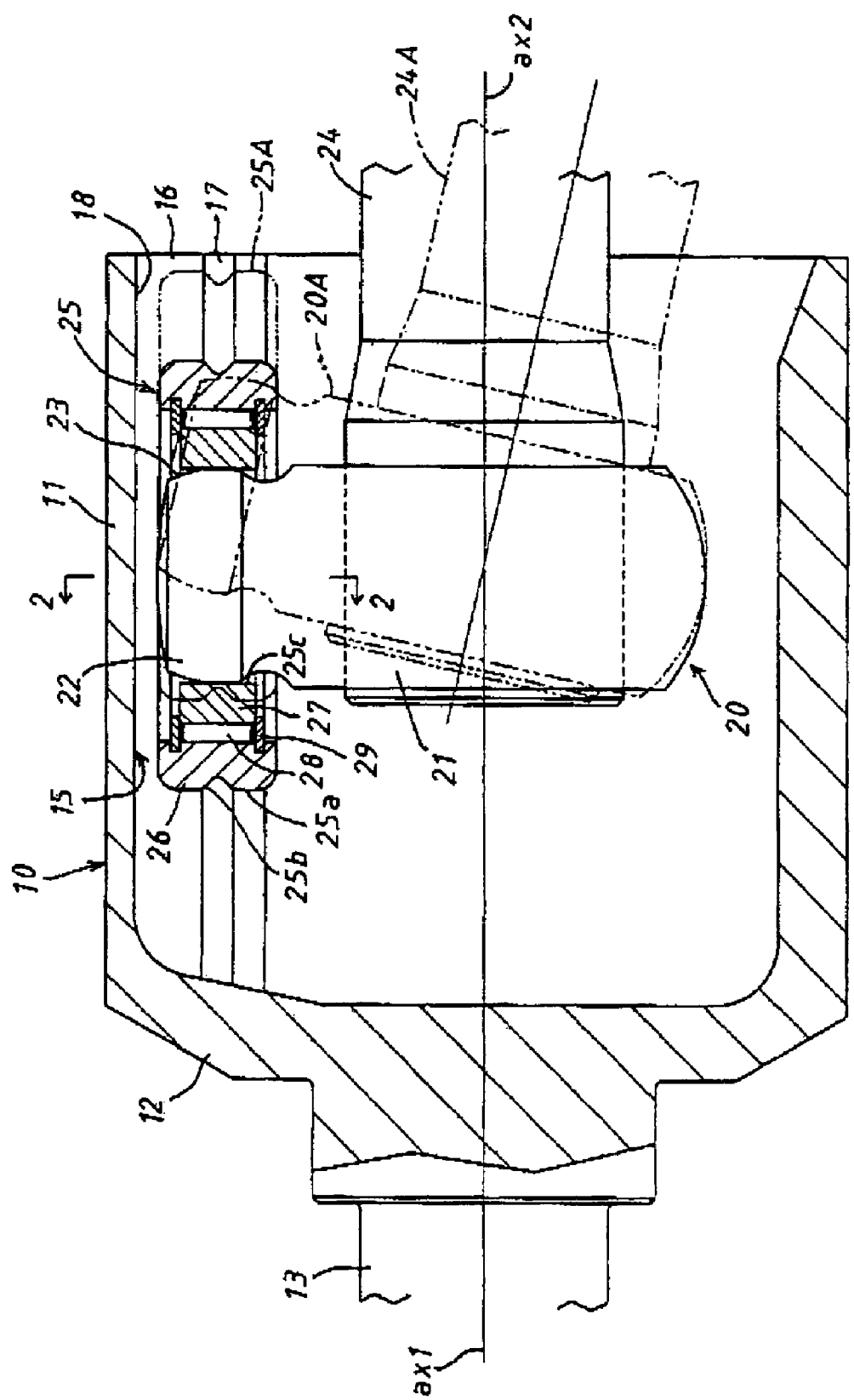
FIG. 1 is a longitudinal sectional view showing a whole structure of a constant velocity universal joint according to a first embodiment of the present invention.
Figure 2:
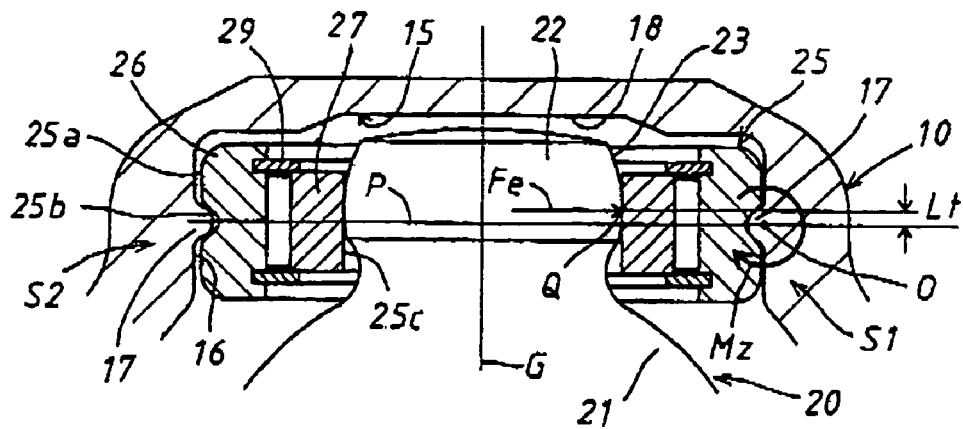
FIG. 2 is a cross-sectional view taken along the line 2-2 in FIG. 1.
Figure 3:
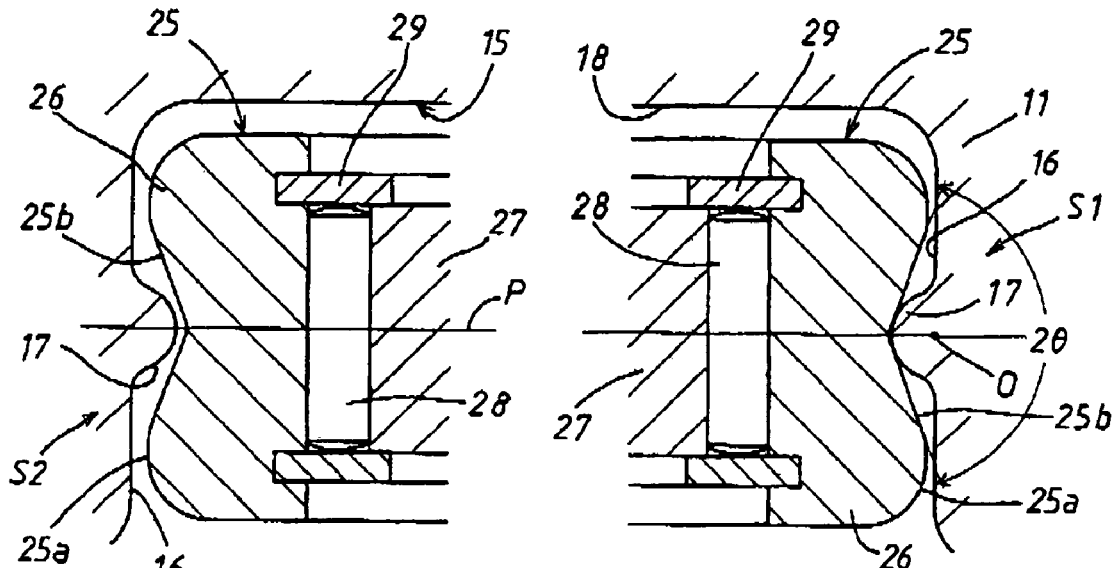
FIG. 3 is a view showing a main portion of FIG. 2.

As shown in FIGS. 1 to 3, the outer joint member 10 includes a cylindrical body 11 having a central axis ax1, and a bottom portion 12 that closes axial one end of the cylindrical body 11. A first rotating shaft 13 is provided on an outer side of the bottom portion 12 so as to be coaxial with the cylindrical body 11. The cylindrical body 11, the bottom portion 12, and the first rotating shaft 13 are integrally formed by means of forging, and the like. Three guide grooves 15 are formed on an inner periphery of the cylindrical body 11 at intervals of 120 degrees in a circumferential direction over the entire length of the cylindrical body 11 so as to extend in parallel with the central axis ax1. The other end of the cylindrical body 11 provided on an opposite side to the bottom portion 12 is open. As shown in FIG. 2, each guide groove 15 of a constant cross-sectional shape includes a pair of strip-shaped inner side faces 16 facing in parallel with each other relative to a plane G that extends radially from the central axis ax1, and extending in parallel with the central axis ax1. The guide groove 15 further includes a bottom face 18 formed perpendicular to the plane G so as to connect respective edges of the inner side faces 16. A pair of guide projections 17 facing each other are formed on the pair of inner side faces 16 respectively. Each guide projection 17 is formed on a substantially center portion in a height direction, i.e. in a vertical direction in FIGS. 2 and 3, of the inner side face 16 so as to extend in parallel with the central axis ax1. The guide projection 17 has a half-arc shape in cross section that is formed with reference to an O point (i.e. center O), which is positioned on an extending line of the inner side face 16 as shown in FIGS. 2 and 3. A width between root portions of the guide projection 17, i.e. a diameter of the half-arc of the guide projection 17, is much smaller than a height of the inner side face 16, i.e. a vertical length thereof, as shown in FIGS. 2 and 3. The root portion is connected to the inner side face 16 by means of a small arc. A plane formed by connecting centerlines extending in parallel with the central axis ax1 and passing through respective centers O of the half-arc cross sections of the pair of guide projections 17 facing each other constitutes a center plane P. At this time, the center O is not necessarily positioned on the extending line of the inner side face 16 and may be positioned closer or farther relative to the center plane P in some degree as compared to a case in which the center O is positioned on the extending line of the inner side face 16.

As shown in FIGS. 1 and 2, the inner joint member 20 includes a boss portion 21 having a central axis ax2, and three tripod shafts 22 radially outwardly extending from the boss portion 21 at intervals of 120 degrees. A short-height tripod spherical face 23 of a barrel shape is formed on a radially end portion of each tripod shaft 22. A second rotating shaft 24 is coaxially secured to the boss portion 21 by means of a spline and the like. A radius from the central axis ax2 of the inner joint member 20 to a center of the tripod spherical face 23 is equal to a distance from the central axis ax1 of the outer joint member 10 to the center plane P formed by connecting the pair of guide projections 17.

The roller unit 25 according to the present embodiment is of a double roller type. As shown in FIGS. 1 and 2, the roller unit 25 includes an outer roller 26 and an inner ring 27 that engages coaxially with the outer roller 26 and arranged on an inner peripheral side of the outer roller 26 by means of a needle roller (rolling element) 28 so as to be roratable relative to the outer roller 26. A movement of the inner ring 27 and the needle roller 28 relative to the outer roller 26 in an axial direction is restricted by stopper rings 29 respectively engaging with axially end portions on an inner peripheral side of the outer roller 26. The roller unit 25 is supported on a tip end portion of the tripod shaft 22 so as to be slidable in the axial direction of the outer joint member 10 and rotatable relative to the center of the tripod spherical face 23 by engagement between a cylindrical inner peripheral face 25c of the inner ring 27 and the tripod spherical face 23 of the tripod shaft 22.

As shown in FIGS. 2 and 3, an annular recess 25b is formed, extending in a circumferential direction, on a substantially center portion in a height direction of a cylindrical outer peripheral face 25a, i.e. in a vertical direction in FIGS. 2 and 3, of the outer roller 26. The recess 25b engages with the pair of guide projections 17 by rolling thereon, i.e. in a rolling manner. A cross section of the recess 25b is of a V-shape with an apex angle 2θ. An apex portion and root portions connected to the outer peripheral face 25a are chamfered so as to form arcs respectively. In addition, both linearly inclined faces symmetrically formed relative to the apex portion of the recess 25b are in contact with an arc face of the guide projection 17. The outer roller 26 can be inserted into the guide groove 15 from the axial direction of the outer joint member 10 such that the pair of guide projections 17 engage with the recess 25b. When the outer roller 26 is pressed against one side (i.e. loaded side S1) in a diameter direction perpendicular to the plane G by application of a driving torque to the constant velocity universal joint in a state in which the outer roller 26 is positioned within the guide groove 15 in the aforementioned manner, the both inclined faces of the recess 25b are made contact to engage with the arc face of the guide projection 17 on the loaded side S1. In addition, a small gap is formed between the outer peripheral face 25a and the inner side face 16 of the guide groove 15. Meanwhile, on the other side (i.e. non-loaded side) S2, a most part of the guide projection 17 is inserted into the recess 25b with keeping a small gap therebtween. In addition, a gap is formed between the outer peripheral face 25a and the inner side face 16 of the guide groove 15, which is slightly larger than that formed on the loaded side S1. At this time, on the non-loaded side S2, 70% or more of the guide projection 17 may be inserted into the recess 25b. That is, 70% or more of projecting amount of the guide projection 17 extending perpendicular to the inner side face 16 may be received on an inner side of the outer roller 26 relative to the outer peripheral face 25a. In such circumstances, the roller unit 25 is rotatable relative to an axis extending in parallel with the central axis ax1 and passing through the center O of the half-arc face of the guide projection 17 on the non-loaded side S2 (hereinafter called simply "relative to the center O") within a restriction of a gap formed between the recess 25b and the guide projection 17 on the non-loaded side S2. A half apex angle θ of the recess 25b may be in a range between 60 to 80 degrees, and an optimum value may be 70 degrees.

Figure 4:
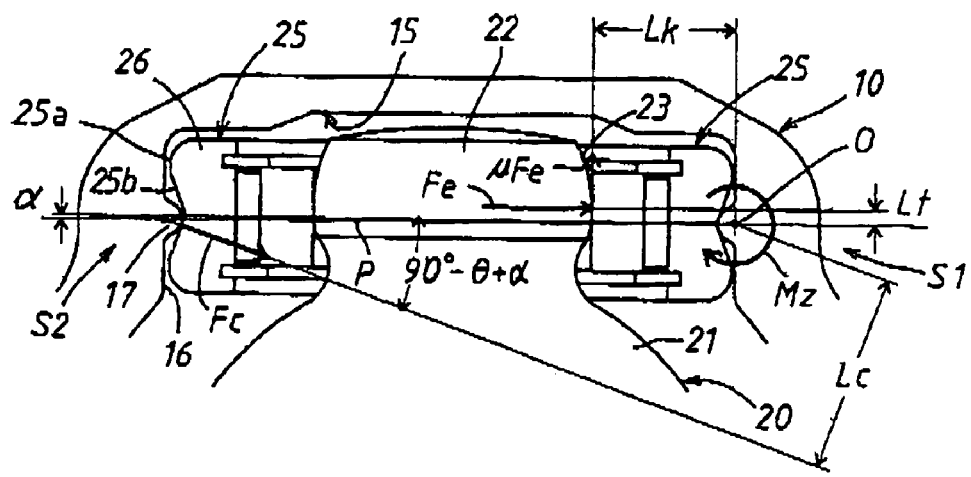
FIG. 4 is an explanatory view of an operation of the constant velocity universal joint according to the first embodiment of the present invention.

The constant velocity universal joint according to the present embodiment is used, for example, in a power transmission system of an automobile in such a manner that the first rotating shaft 13 is assembled on a side gear of a differential device while the second rotating shaft 24 is connected to a driving shaft for driving wheels. As shown by chain double-dashed lines 20A, 24A, and 25A in FIG. 1, when the constant velocity universal joint is rotated with a joint angle defined between the central axis ax1 of the outer joint member 10 and the central axis ax 2 of the inner joint member 20, the tripod spherical face 23 formed on the tip end of the tripod shaft 22 reciprocates in a radial direction relative to the roller unit 25, whose position in the radial direction is specified at a position of the center plane P formed by connecting the pair of guide projections 17 facing each other as the recess 25b engages with the pair of guide projections 17 formed on the guide groove 15 of the outer joint member 10. Then, a variable offset Lt is generated between a line of action of force Fe passing through a contact point Q between the tripod spherical face 23 and the inner peripheral face 25c of the inner ring 27, and the center O of the guide projection 17. In a state shown in FIG. 2, moment Mz for rotating the roller unit 25 relative to the center O of the guide projection 17 is generated on the loaded side S1. Further, friction force μFe is generated at the contact point Q between the inner peripheral face 25c of the inner ring 27 and the tripod spherical face 23 shifted in the radial direction relative to the inner peripheral face 25c. A distance between a line of action of the friction force μFe and the center I is Lk as shown in FIG. 4. The friction force μFe and the distance Lk also generate moment Mz for rotating the roller unit 25 relative to the center O.

In cases where the roller unit 25 is rotated by means of the moment Mz obtained by the force Fe and the offset Lt, and by the friction force μFe and the distance Lk, one of the inclined faces of the recess 25b on the non-loaded side S2 is made contact with the arc face of the guide projection 17, thereby stopping a rotation of the roller unit 25. Then, reaction force Fc for pushing the inclined face of the recess 25b is generated on the guide projection 17. A distance between a line of action of the reaction force Fc and the center O is Lc as shown in FIG. 4.

Figure 9:
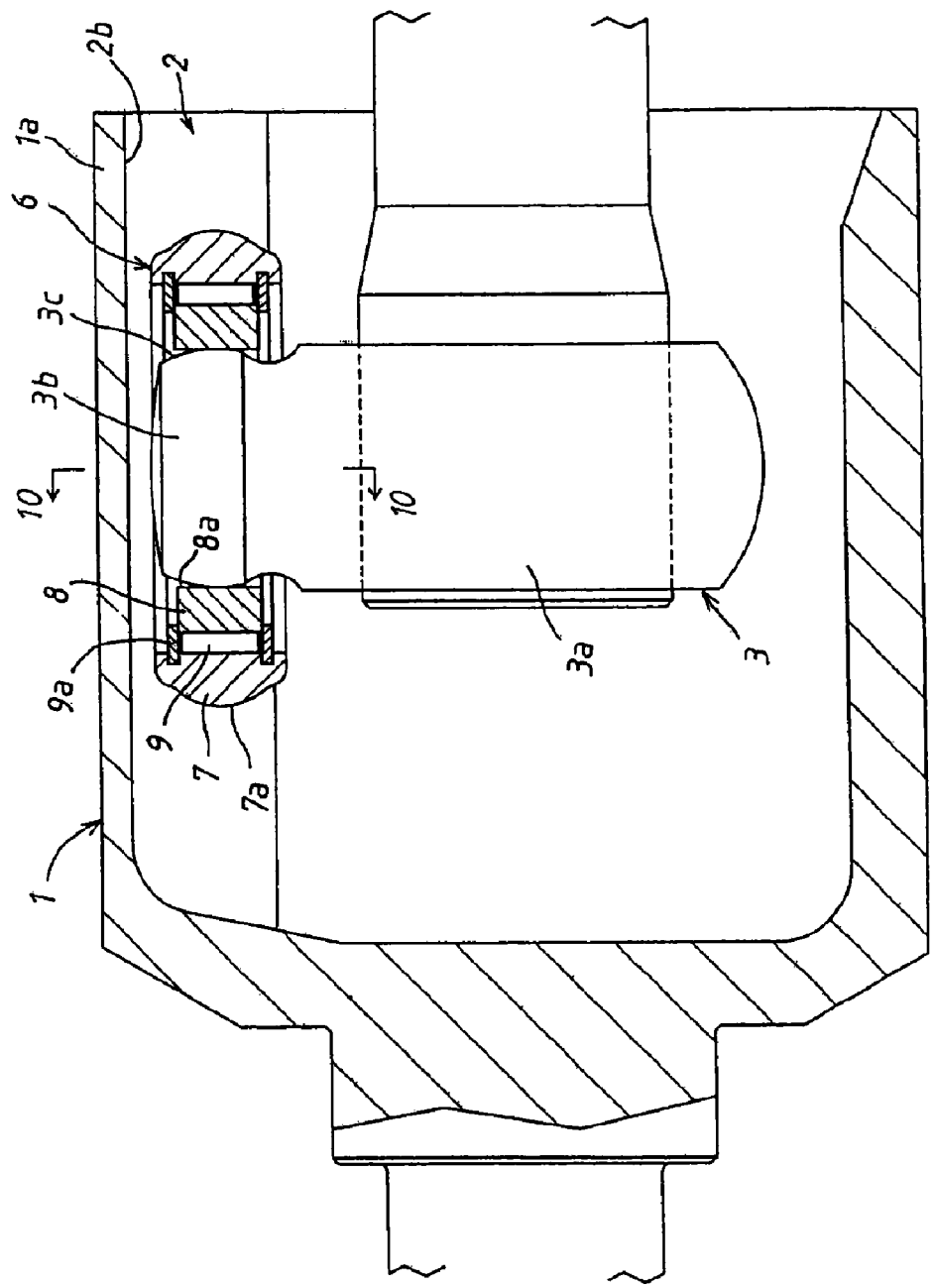
FIG. 9 is a longitudinal sectional view showing a whole structure of a conventional constant velocity universal joint.
Figure 10:
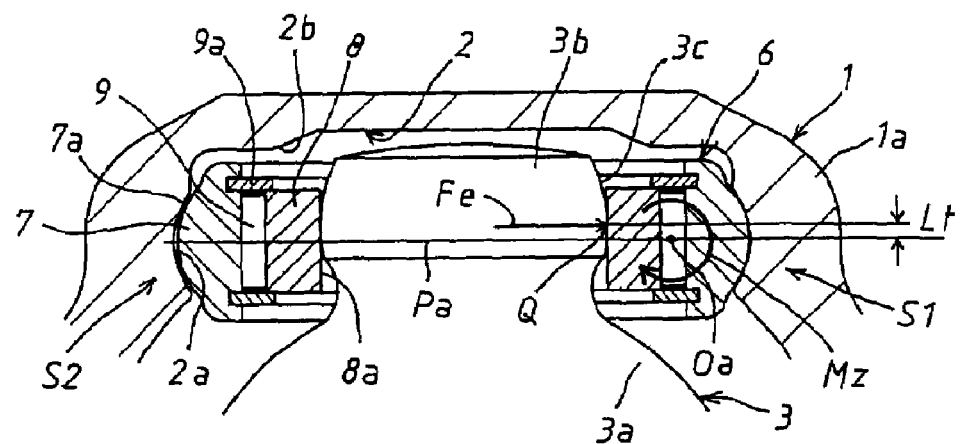
FIG. 10 is a cross-sectional view taken along the line 10-10 in FIG. 9.
Figure 11:
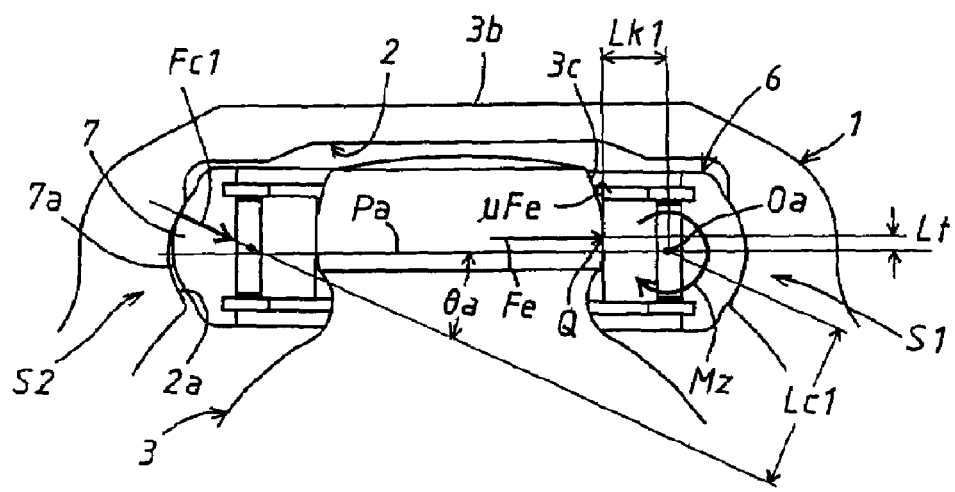
FIG. 11 is an explanatory view of an operation of the constant velocity universal joint in FIG. 10.

According to the aforementioned embodiment, a gap formed between the recess 25b and the guide projection 17 on the non-loaded side S2 is small. Since the half apex angle θ of the recess 25b is relatively large, i.e. 70 degrees for example, a rotating angle α of the roller unit 25 is extremely small. Further, an inclination angle of the line of action of the reaction force Fc relative to the center plane P is 90 degrees −θ+α, which is much larger than the inclination angle θa according to the known work explained in FIG. 11. Thus, the distance Lc is much lager than the distance Lc1 of the known work, which leads to much smaller reaction force Fc than the reaction force Fc1. Accordingly, the friction resistance associated with the contact between the guide projection 17 and the recess 25b is smaller than that of the known work explained in FIGS. 9 to 11, which results in small induced thrust that is generated in association with the contact between the guide projection 17 and the recess 25b. As a result, possibility of vibration, noise, and power loss may be reduced. Further, since a gap formed between the guide projection 17 and the recess 25b on the non-loaded side S2 is small, looseness of the constant velocity universal joint in the rotation transmitting direction is prevented from increasing. In cases where the half apex angle θ of the recess 25b is made small, the inclination angle of the line of action of the reaction force Fc relative to the center plane P (i.e. 90 degrees −θ+α) becomes large, thereby reducing the reaction force Fc.

According to the aforementioned embodiment, the recess 25b has a V-shape in cross section. Then, on the non-loaded side S2, most parts of the recess 25b and the guide projection 17 engage with each other with keeping a small gap therebetween. Thus, the line of action of the reaction force Fc applied from the guide projection 17 to the recess 25b is substantially perpendicular to the inclined face of the recess 25b that is in contact with the guide projection 17. An angle formed between the line of action of the reaction force Fc and the center plane P formed by connecting the pair of guide projections 17 are substantially constant. Accordingly, even if a size of a gap formed between the guide projection 17 and the recess 25b in contact with each other on the non-loaded side S2 varies due to manufacturing variations, friction, and the like, fluctuation in friction force generated between the guide projection 17 and the recess 25b is small, thereby achieving stable operation of the constant velocity universal joint. In this case, the inclined face of the recess 25b is in contact with a middle portion in a height direction of the guide projection 17 on the non-loaded side S2.

Figure 5:
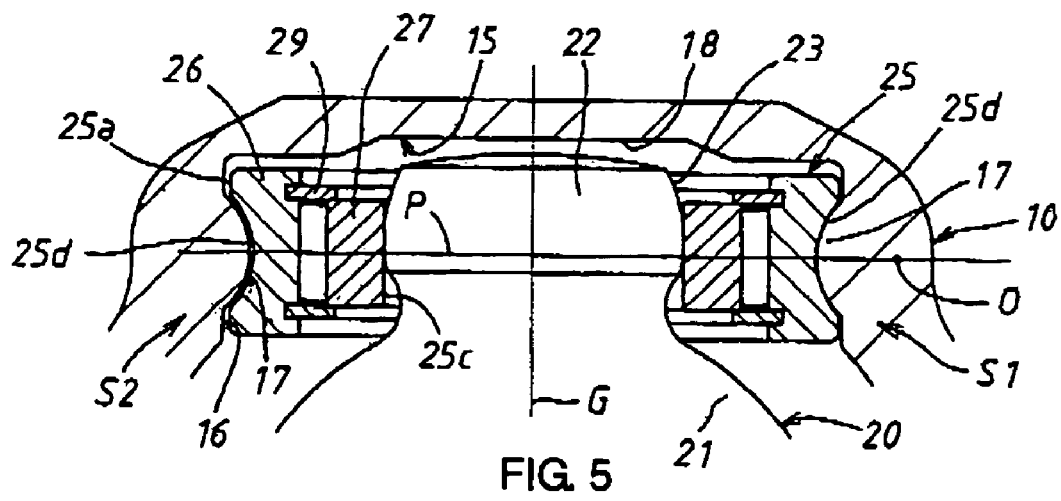
FIG. 5 is an explanatory view of a constant velocity universal joint according to a second embodiment of the present invention.
Figure 6:
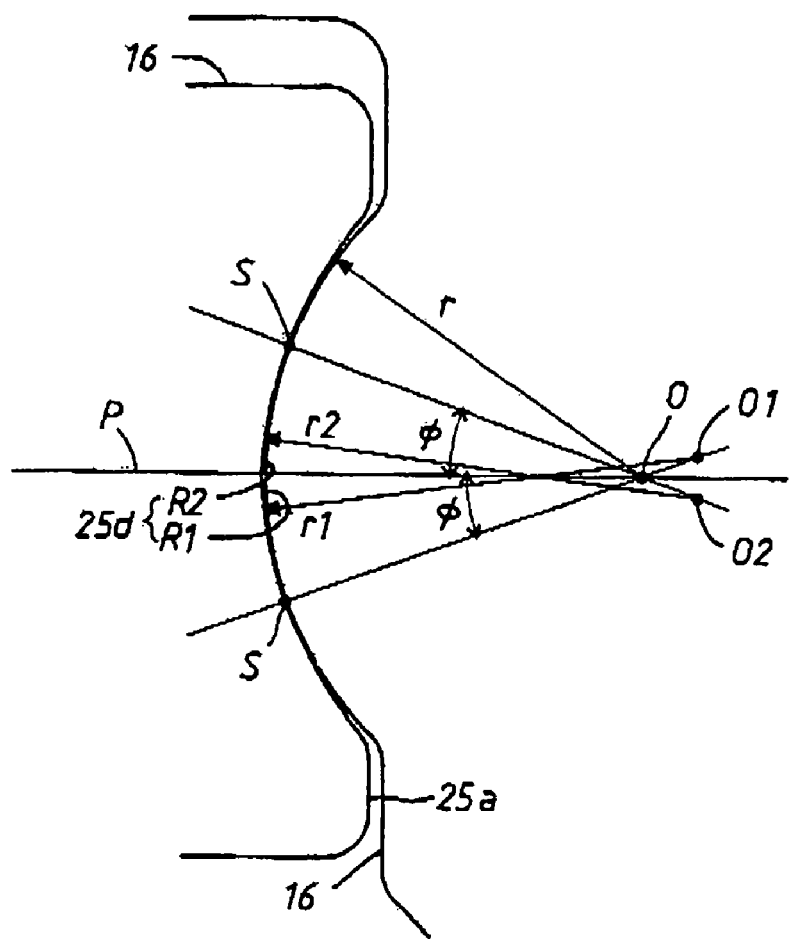
FIG. 6 is a partially enlarged view of FIG. 5.

A second embodiment of the constant velocity universal joint is explained with reference to FIGS. 5 to 8. FIG. 5 is a cross-sectional view corresponding to FIG. 2 according to the first embodiment. FIG. 6 is a partially enlarged view of FIG. 5. According to the second embodiment, a recess formed on the outer peripheral face 25a of the outer roller 26 is constituted by arcs R1 and R2 in cross section, instead of a V-shaped cross section, each having a radius slightly larger than that of the arc face of the guide projection 17, which is the only difference from the first embodiment and thus the detailed explanation for the other parts is omitted.

As shown in FIGS. 5 and 6, a recess 25d formed on the outer peripheral face 25a of the outer roller 26 has a symmetrical cross section in an axial direction with respect to the center plane P. The arcs R1 and R2 arranged on both sides of the center plane P in a vertical direction in FIGS. 5 and 6 have a radius r1 and a radius r2 respectively, which are slightly larger than a radius r of the arc face of the guide projection 17. The radius r1 and the radius r2 may be 1.05 to 1.3 times the radius r of the arc face of the guide projection 17. If the radius r1 and the radius r2 are 1.05 or less times the radius r, sliding resistance may be increased between the recess 25d and the guide projection 17 since respective radii r1, r2, and r are equal to one another. A rotation of the roller unit 25 relative to the center O may be nonsmooth. Further, if the radius r1 and the radius r2 are 1.3 or more times the radius r, plane pressure between the recess 25d and the guide projection 17 may be increased because of a reduced contact area therebetween, which leads to decrease of durability. The radius r1 and the radius r2 may be 1.1 to 1.25 times the radius r as an optimum range, and be 1.2 times as an optimum value.

As shown in FIG. 6, a center O2 of the arc R2 arranged upper side of the center plane P is positioned below the center plane P while a center O1 of the arc R1 arranged lower side of the center plane P is positioned above the center plane P. In such a structure, an outer face of the guide projection 17 and an inner face of the recess 25d are in contact with each other through a larger contact area than a case in which the recess has a V-shaped cross section. Thus, the plane pressure of the contact portion is decreased, i.e. abrasion thereof is reduced, thereby enhancing durability. In practice, the guide projection 17 and the recess 25d are in contact through an elliptical area (which is hereinafter called a "contact ellipse R").

Figure 7:
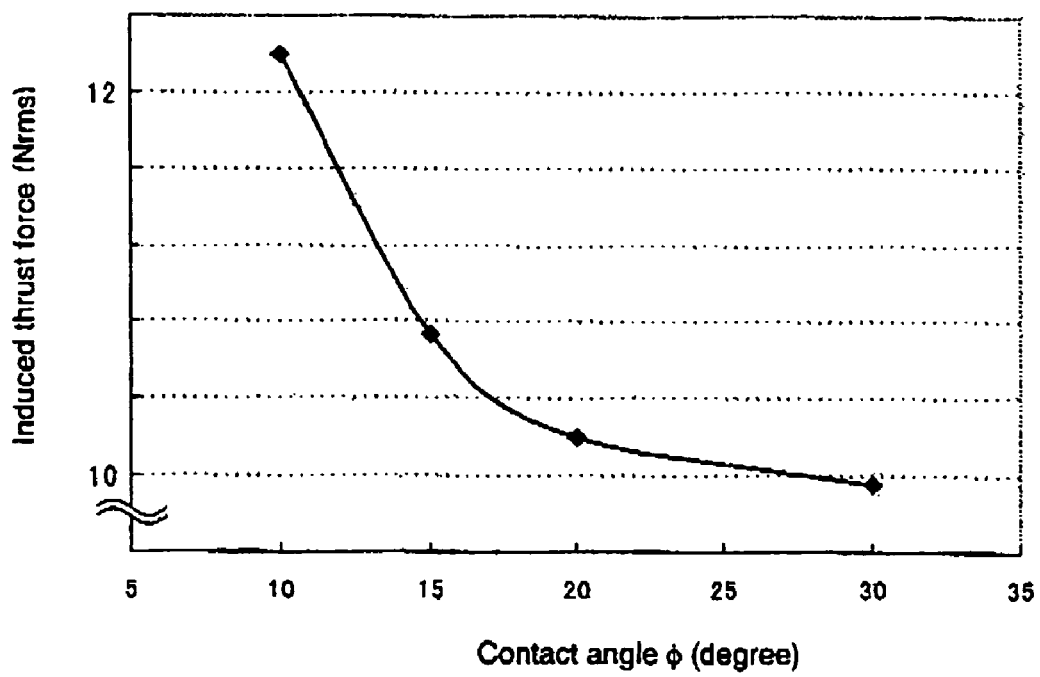
FIG. 7 is a graph showing a relationship between a contact angle $\phi$ and induced thrust.
Figure 8:
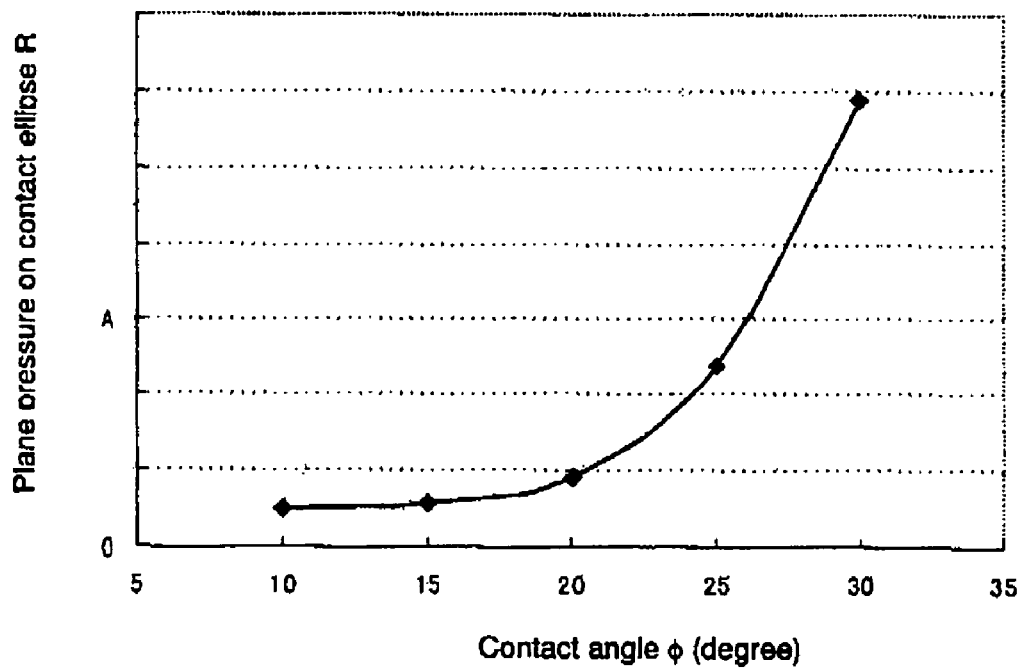
FIG. 8 is graph showing a relationship between a contact angle and a contact ellipse R.

A contact angle $\phi$, which is formed between a straight line that connects the center O of the arc face of the guide projection 17 on the loaded side S1 and a center point S of the contact ellipse R, and the center plane P as shown in FIG. 6 in a state in which the central axis ax1 of the outer roller 26 is in parallel with the tripod shaft 22, varies depending on a center position of the arc formed on the recess 25d. A relationship between the contact angle $\phi$ and induced thrust force is shown in FIG. 7. A relationship between the contact angle $\phi$ and the plane pressure on the contact ellipse R is shown in FIG. 8. As shown in FIG. 7, in case of the large contact angle $\phi$, a distance between a line of action of reaction force by which the guide projection 17 pushes the arc face of the recess 25d and the center O becomes large, which leads to reduction of induced thrust force. Meanwhile, as shown in FIG. 8, in view of reducing the plane pressure on the contact ellipse R, the contact angle $\phi$ may be small. This is because, in the cases that the contact angle $\phi$ is large, the center point S of the contact ellipse R is shifted toward an end portion of the recess 25d, thereby causing a lack of a part of the contact ellipse R. The guide projection 17 and the recess 25d are in contact with each other through a small area accordingly. Especially when the plane pressure exceeds an A value in the graph shown in FIG. 8, the durability is drastically decreased. As a result, the contact angle $\phi$ may be 15 to 25 degrees. The optimum value of the contact angle $\phi$ may be 20 degrees.

According to the aforementioned embodiments, the roller unit 25 is of a double roller type constituted by the outer roller 26 having the outer peripheral face 25a on which the recess 25b or 25d is formed, and the inner ring 27 having the inner peripheral face 25c and engaging with an inner periphery of the outer roller 26 by means of the needle roller 28 in such a manner that the inner ring 27 is relatively rotatable to the outer roller 26, and a relative movement therebetween in an axial direction is restricted. Accordingly, in cases where the constant velocity universal joint is rotated with a joint angle formed between the central axis ax1 of the outer joint member 10 and the central axis ax 2 of the inner joint member 20, the friction resistance generated when the roller unit 25 rolls along a longitudinal direction of the guide groove 15 is reduced by means of the needle roller 28 disposed between the outer roller 26 and the inner ring 27. Then, the induced thrust force for pushing the outer joint member 10 and the inner joint member 20 in axially opposite directions each other by means of friction resistance generated between the outer joint member 10 and the inner joint member 20 is decreased, thereby further reducing vibration, noise, and a power loss occurring on the constant velocity universal joint.

Further, according to the aforementioned embodiments, in the case that the constant velocity universal joint is rotated with a joint angle, the roller unit 25 is rotated relative to the center O of the guide projection 17 on the loaded side S1 by means of the moment obtained by the offset between the line of action of force acting on the contact point between the tripod spherical surface 23 and the inner peripheral face 25c of the roller unit 25, and the center O of the half arc cross section of the guide projection 17. On the non-loaded side S2, the recess 25b is restricted to rotate by the contact with the guide projection 17. When the joint angle varies, the roller unit 25 is rotated relative to the center O of the guide projection 17 on the loaded side S1. At this time, the center O is positioned within the outer joint member 10, not in the roller unit as in the conventional constant velocity universal joint. Thus, a distance from the contact portion between the recess 25b and the guide projection 17 to the center O on the non-loaded side S2 is increased, thereby achieving reduction of the induced thrust. The occurrence of vibration and noise may be reduced.

Furthermore, according to the aforementioned embodiments, an angle formed between the line of action of the reaction force added to the recess 25b from the guide projection 17, and the center plane P formed by connecting the pair of guide projections 17 is large. Thus, the reaction force is small, thereby achieving reduced friction resistance associated with the contact between the guide projection 17 and the recess 25b. The induced thrust is accordingly reduced, which leads to further reduction of the vibration and noise.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A constant velocity universal joint comprising:
   an outer joint member including a cylindrical body whose inner peripheral face is formed with three guide grooves at even intervals, each guide groove extending in parallel with a central axis of the cylindrical body;

an inner joint member including three tripod shafts extending radially outwardly at even intervals from a boss portion, each tripod shaft being formed with a tripod spherical face at a tip end portion;

three roller units each including an outer peripheral face and a cylindrical inner peripheral face coaxially formed with each other, the inner peripheral face slidably engaging with the tripod spherical face, the outer peripheral face engaging with the guide groove in a rolling manner along with a longitudinal direction of the guide groove;

the guide groove including a pair of strip-shaped inner side faces facing in parallel with each other relative to a plane radially extending from the central axis and a guide projection provided substantially centrally in the guide groove between the pair of inner side faces, wherein the guide projection has a substantially half arc shape in cross section whose diameter is smaller than a height of the guide groove; and an annular recess formed on a substantially center portion in a height direction of the outer peripheral face of the roller unit so as to extend in a circumferential direction and engaging with the guide projection in a rolling manner and rotatable relative to a central axis of the guide projection.

2. A constant velocity universal joint according to claim 1, wherein the recess is of a V-shape in cross section and both inclined faces are in contact with the guide projection.

3. A constant velocity universal joint according to claim 1, wherein the recess is of an arc shape in cross section and a diameter of the arc is larger than that of the half arc of the guide projection.

4. A constant velocity universal joint according to claim 1, wherein the recess is pressed against the guide projection to engage therewith on a loaded side that is positioned on one end in a diameter direction of the roller unit while a most part of the guide projection is inserted into the recess with a small gap therebetween on a non-loaded side positioned on the other end in the diameter direction of the roller unit.

5. A constant velocity universal joint according to claim 2, wherein the recess is pressed against the guide projection to engage therewith on a loaded side that is positioned on one end in a diameter direction of the roller unit while a most part of the guide projection is inserted into the recess with a small gap therebetween on a non-loaded side positioned on the other end in the diameter direction of the roller unit.

6. A constant velocity universal joint according to claim 3, wherein the recess is pressed against the guide projection to engage therewith on a loaded side that is positioned on one end in a diameter direction of the roller unit while a most part of the guide projection is inserted into the recess with a small gap therebetween on a non-loaded side positioned on the other end in the diameter direction of the roller unit.

7. A constant velocity universal joint according to claim 1, wherein the roller unit includes an outer roller having the outer peripheral face on which the recess is formed, and an inner ring having the inner peripheral face and engaging with an inner periphery of the outer roller by means of a rolling element in such a manner that the inner ring is relatively rotatable with the outer roller and an axial movement of the inner ring is restricted.

8. A constant velocity universal joint according to claim 2, wherein the roller unit includes an outer roller having the outer peripheral face on which the recess is formed, and an inner ring having the inner peripheral face and engaging with an inner periphery of the outer roller by means of a rolling element in such a manner that the inner ring is relatively rotatable with the outer roller and an axial movement of the inner ring is restricted.

9. A constant velocity universal joint according to claim 3, wherein the roller unit includes an outer roller having the outer peripheral face on which the recess is formed, and an inner ring having the inner peripheral face and engaging with an inner periphery of the outer roller by means of a rolling element in such a manner that the inner ring is relatively rotatable with the outer roller and an axial movement of the inner ring is restricted.

10. A constant velocity universal joint according to claim 4, wherein the roller unit includes an outer roller having the outer peripheral face on which the recess is formed, and an inner ring having the inner peripheral face and engaging with an inner periphery of the outer roller by means of a rolling element in such a manner that the inner ring is relatively rotatable with the outer roller and an axial movement of the inner ring is restricted.

11. A constant velocity universal joint according to claim 1, wherein the outer joint member includes a bottom portion for closing axial one end of the cylindrical body, and a rotating shaft is provided on an outer side of the bottom portion so as to be coaxial with the cylindrical body.

12. A constant velocity universal joint according to claim 11, wherein a rotating shaft is coaxially secured to the boss portion of the inner joint member.

13. A constant velocity universal joint according to claim 7, wherein the axial movement of the inner ring relative to the outer roller is restricted by means of stopper rings respectively engaging with axially end portions on an inner peripheral side of the outer roller.

14. A constant velocity universal joint according to claim 1, wherein the roller unit being assembled on the guide groove in such a manner that the outer peripheral face of the roller unit does not engage with said guide groove except at said guide projection.

* * * * *